(12) United States Patent
Zirkle

(10) Patent No.: US 7,942,198 B2
(45) Date of Patent: May 17, 2011

(54) AERATOR FOR A WELL WATER PUMPING SYSTEM

(76) Inventor: Howard W. Zirkle, Elyria, OH (US)

( * ) Notice: Subject to any disclaimer, the term of this patent is extended or adjusted under 35 U.S.C. 154(b) by 0 days.

(21) Appl. No.: 12/284,009

(22) Filed: Sep. 18, 2008

(65) Prior Publication Data
US 2010/0282473 A1 Nov. 11, 2010

(51) Int. Cl.
*E21B 34/08* (2006.01)
*C02F 1/74* (2006.01)
(52) U.S. Cl. .................. 166/112; 166/105; 210/170.07
(58) Field of Classification Search .............. 166/105, 166/68, 112; 261/16; 210/170.06, 170.07
See application file for complete search history.

(56) References Cited

U.S. PATENT DOCUMENTS

| | | | |
|---|---|---|---|
| 4,444,259 A * | 4/1984 | Schwall | 166/265 |
| 4,478,765 A | 10/1984 | Tubbs | |
| 4,582,610 A * | 4/1986 | Baker | 210/747 |
| 4,608,163 A | 8/1986 | Yohe et al. | |
| 4,624,626 A * | 11/1986 | Sherfinski et al. | 417/87 |
| 4,659,463 A | 4/1987 | Chandler et al. | |
| 4,720,360 A * | 1/1988 | Melber | 261/76 |
| D317,347 S * | 6/1991 | Whitley, II | D23/213 |
| 5,096,580 A | 3/1992 | Auchincloss | |
| 5,147,530 A | 9/1992 | Chandler et al. | |
| 5,354,459 A | 10/1994 | Smith | |
| 5,660,721 A | 8/1997 | Kyriss et al. | |
| 5,699,859 A * | 12/1997 | Poirier | 166/112 |
| 5,979,478 A * | 11/1999 | Screptock et al. | 137/3 |

* cited by examiner

*Primary Examiner* — Kenneth Thompson

(57) ABSTRACT

A novel aerator for use inside a well casing in conjunction with a submersible pump, the aerator comprising a check-valve with a nozzle for spraying a portion of a water supply that is being pumped by the pump. The spray is directed towards the well water within the well casing and is calibrated to provide enough agitation to promote the evolution of dissolved gases in the water both as it is sprayed and also as the spray contacts the surface of the well water. The check-valve is calibrated to operate at a pressure threshold to ensure that spraying occurs only when the pump is running.

7 Claims, 3 Drawing Sheets

AERATOR FOR A WELL WATER PUMPING SYSTEM

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an aerator for a well water pumping system. More particularly, the present invention relates to an aerator for discharging noxious volatiles in pumped well water.

Well water is often considered to be more desirable than drinking water from municipal water sources. Municipal water is treated extensively to remove solids, organics and finally infused with chlorine to kill any pathogenic bacteria or viruses. In contrast, well water is often laden with solubilized metals such as iron, calcium, magnesium. Calcium and magnesium in particular are found in so-called hard water usually in the form of their carbonates. While it may be a matter of taste, many people prefer drinking well water and find the differences that can be discerned with the additional metal ions to be pleasurable. Municipal water may be drawn from soft water sources such as lakes, or it may be treated for hardness, thus reducing the amounts of metal ions and rendering the water less "tasty."

Well water does typically include other constituents; some of which may be offensive even if they do not occur in dangerous or harmful concentrations. For instance, ammonia is found in many well water supplies. While ammonia can be detected very easily by the human sense of smell, it is unusual for ammonia to accumulate in levels in well water that are thought to be hazardous. Sulfides, usually in the form of Hydrogen Sulfide, can occur in well water supplies. The origin of such sulfides may be from anaerobic decay of organic matter, or it may occur at the edge of sandstone or shale formations. In any event, sulfides may be ejected from well water as a gas and are highly offensive given the typically rotten egg smell that is generated by their emission. Other noxious gases may be present in well water, some occurring naturally such as Methane, others that may have a synthetic origin and have percolated down to the water table.

It is highly desirable for people who are using well water to be able to produce water that is safe, as well as non-offensive. It is most troubling for a user to confront a noxious odor in his/her drinking water and there is no consolation in the fact that the particular gas one is sensing is not harmful at the levels in which it is detected. Therefore many attempts have been made to treat and condition well water to make it more palatable for users. In many cases well water is treated for the removal of "hardness" which is primarily focused on the removal of calcium and magnesium ions. The present invention is not concerned with such chemistry since calcium and magnesium do not normally get emitted as a noxious gas.

There are processes known in the prior art for removing noxious gases. For instance, in U.S. Pat. No. 5,660,721 (Kyriss, et al) teaches the use of an aeration component in a pumped water system. The aeration occurs in a "tower" that contains packing for increasing the exposure of the water to air thus allowing volatiles such as radon, hydrogen sulfide and methane to be blown off owing to ambient vapor pressures of these gases. Kyriss does not teach a system for evolving gas in a submersible or dual stage jet pump system. Similar to Kyriss above, the water treatment system taught in U.S. Pat. No. 5,147,530 (Chandler, et al) uses above-ground aeration and precipitation tanks to remove volatiles from well water supplies.

The water treatment system in U.S. Pat. No. 4,478,765 (Tubbs) does include provisions for returning aerated water to a well water supply. As can be seen in the drawings, aerated well water is produced above ground and a side stream is returned to the well water supply. The aeration actually occurs above-ground and gases are dispersed through an above-ground outlet. In addition, air injected through the aeration process is used to precipitate ions put of the water supply. Tubbs does hot teach an aeration system where the water stream is aerated below ground and within the well.

Another water treatment system known in the prior art is disclosed in U.S. Pat. No. 5,354,459 (Smith) where compressed air is injected into the water supply and the resultant air/water mixture is routed through a filtration system. Smith does not teach an in-well aeration system for the removal of noxious gases. Similarly, the water treatment system disclosed in U.S. Pat. No. 4,659,463 (Chandler, et al) teaches the use of a filtration system to remove impurities from a water supply after it has been aerated. A similar system designed for the removal of iron is shown in U.S. Pat. No. 5,096,580 (Auchincloss) as is a water treatment system for the removal of gaseous impurities as shown in U.S. Pat. No. 4,608,163 (Yobe, et al).

The prior art system generally rely on fairly sophisticated water treatment methods. These methods are designed to bring specific chemical parameters down to compliance levels for the most part. In some cases the systems require a high degree of maintenance and replenishment of resins and or filters. Notwithstanding the benefits of the prior art treatment systems, there still remains a need for a simple, no-maintenance aeration system that will purge a well water supply of noxious gases such as ammonia, sulfides and methane. There is also a need for a treatment system that is durable and once installed will remain working for years or even decades without any attention. There also remains a need for an aeration system that is low cost and which can be assembled and/or installed by an average home owner if so desired.

The use of the present invention in a manner that is unexpected produces a result that is very effective although perhaps not as complete as more sophisticated methodology. In this respect though the benefits of the present invention lie in its simplicity which produces for the user a higher quality well water supply at a very low cost.

SUMMARY OF THE INVENTION

A novel water treatment system for the removal of noxious gases, comprises an in-well aerator fitted in line with a water supply line. The in-well aerator includes a junction "T" fitting, an intermediate fitting, and a check-valve nozzle fitting where the check-valve nozzle fitting is directed to discharge a spray hack to the standing water within the well.

The in-well aerator of the present invention includes components that can be installed in conventional plumbing runs and using conventional plumbing tools. The check-valve nozzle fitting may also be adjusted to commence spraying at a select pressure/

DETAILED DESCRIPTION OF THE PREFERRED EMBODIMENTS

Figure 1:
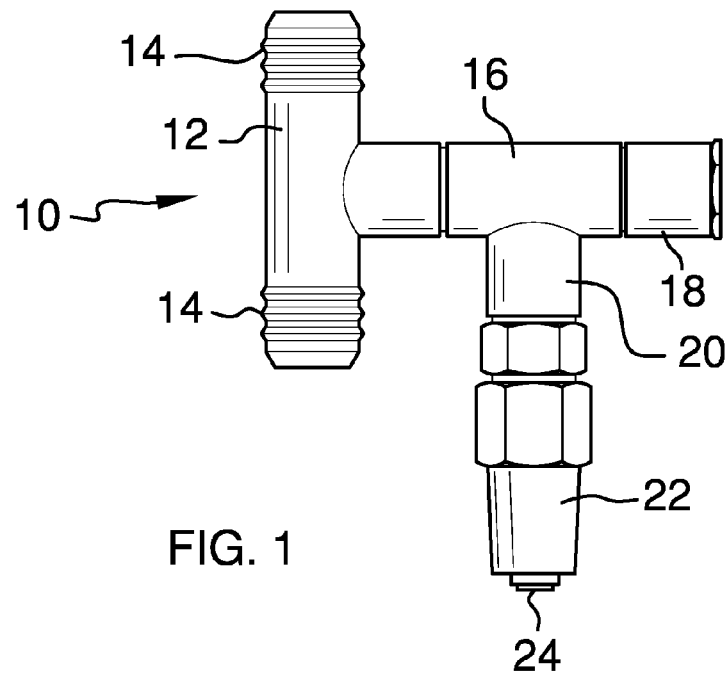
FIG. 1 is a front elevational view of the in-well aerator of the present invention.

A novel aerator for use in volatizing noxious gases dissolved in well water is disclosed within this specification and in the drawings. The benefits of the present invention include the production of better tasting (if not healthier) water from a well water system using an inexpensive device that is both durable and relatively maintenance free.

Figure 2:
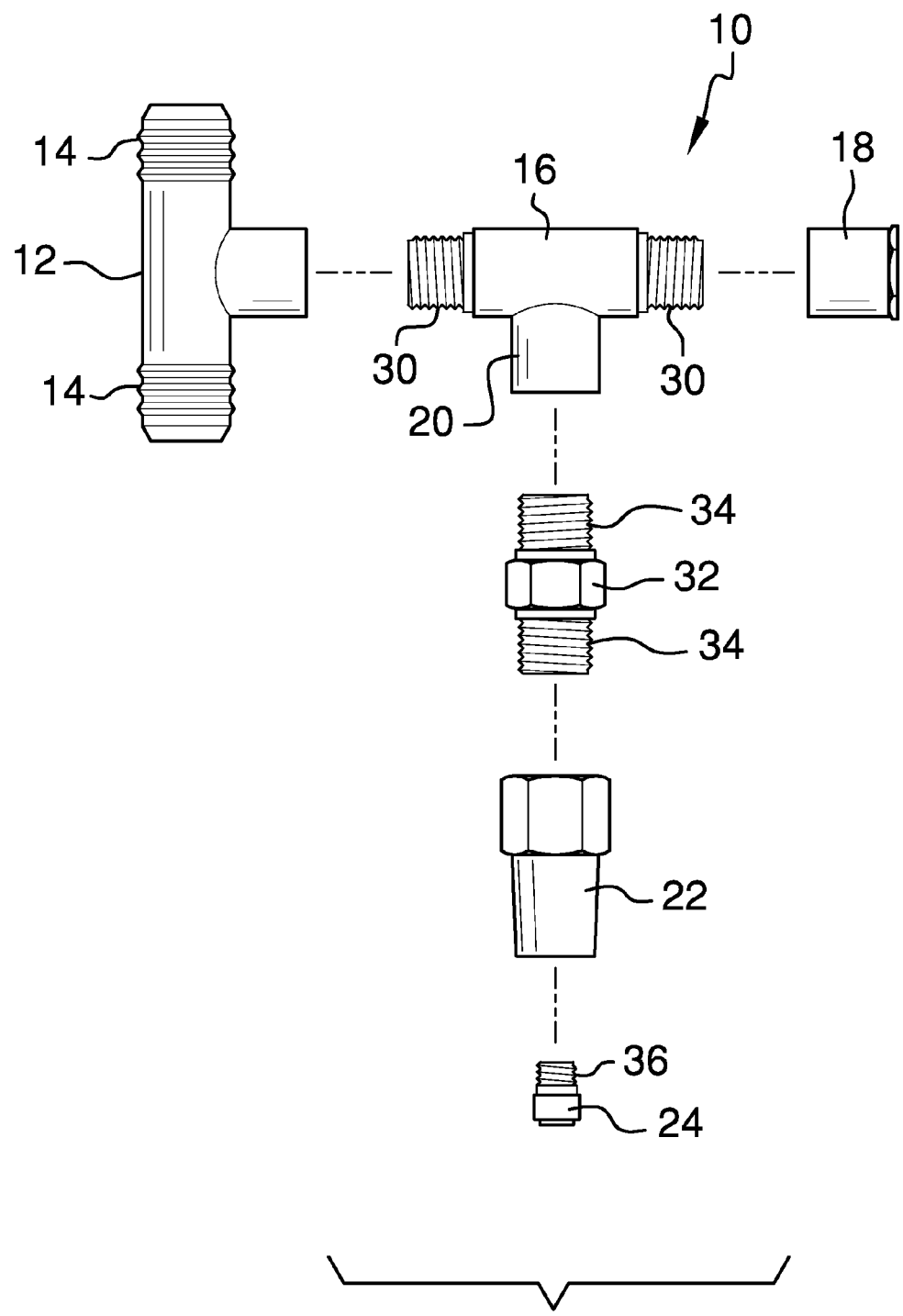
FIG. 2 is an exploded view of the in-well aerator of FIG. 1.

An in-well aerator 10 in accordance with the present invention is shown in FIGS. 1 and 2 and includes a junction "T" fitting 12 with nipple ends 14, an aerator "T" fitting 16 with aerator "T" nipple ends 30 and aerator "T" outlet 20, a plug 18, a check-valve nozzle 22 with nozzle end 24, a couple 32. The coupler 32 includes coupler nipple ends 34. The nozzle end 24 includes nozzle threads 36.

Figure 4:
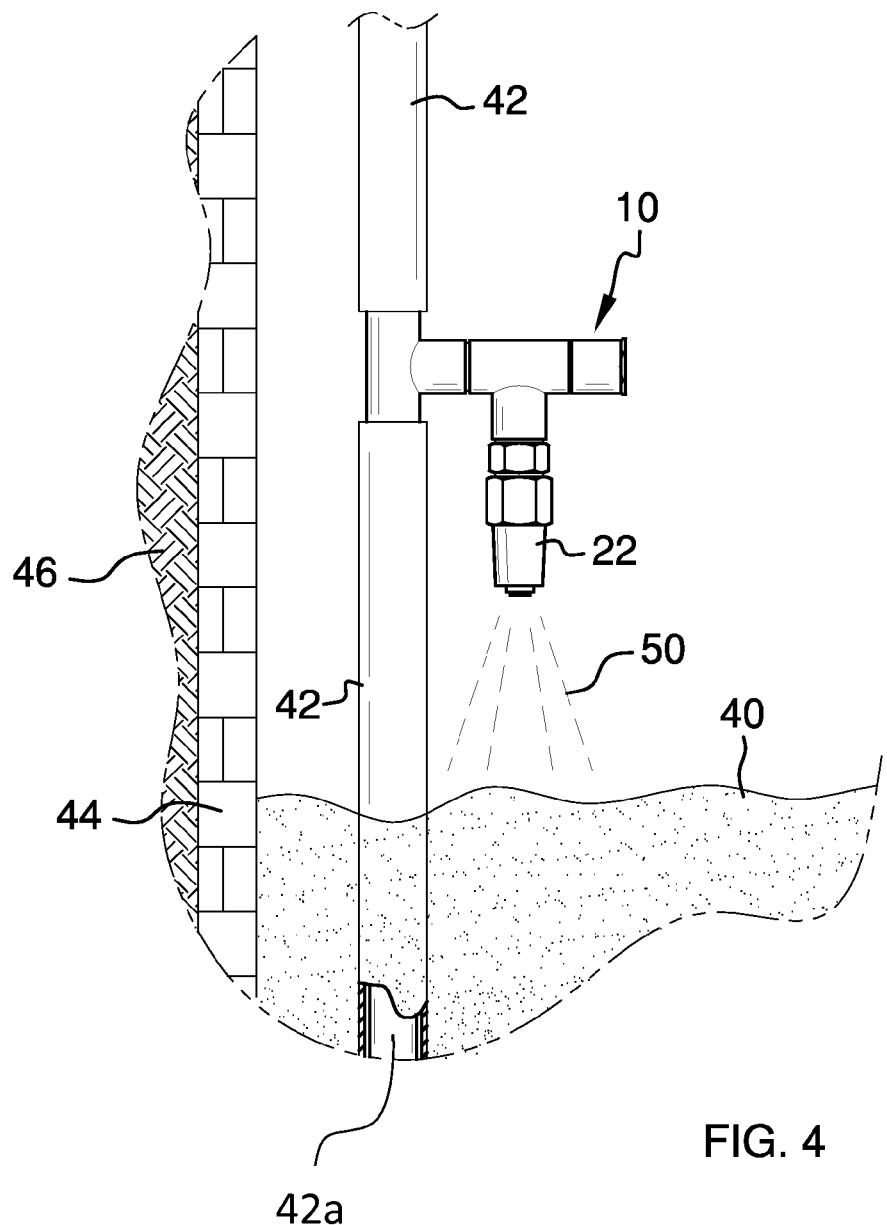
FIG. 4 is a partial cross sectional view of the in-well aerator of the present invention as installed on a water supply line inside a well casing.

In use the in-well aerator 10 is deployed as shown in FIG. 4, where the in-well aerator 10 is installed in a well water supply line 42 which is delivering pumped well water 40. The well casing 44 is shown as is the adjacent soil 46. A spray 50 is shown as being emitted from the check-valve nozzle 22 and is directed downwards towards the well water 40.

The in-well aerator is readily assembled as can be understood from the exploded view in FIG. 2. The components are typically comprised of conventional plumbing fittings and they can be selected to be compatible with either iron piping systems or plastic piping circuits such as PVC (polyvinyl chloride plastic) or CPVC (chlorinated polyvinyl chloride plastic). As shown in the drawings, the check-valve nozzle is directed downwards when installed allowing a spray to be returned to the well water supply. The effect of this spray is believed to act on the dissolved gases within the well water by promoting the vaporization of these gases. The mechanisms by which sprays accomplish this is well known although in this instance the spray is confined to the interior of the well and is not directed to an open air, above ground treatment. The well itself is not air tight and emitted gases can eventually migrate to the exterior.

Figure 3:
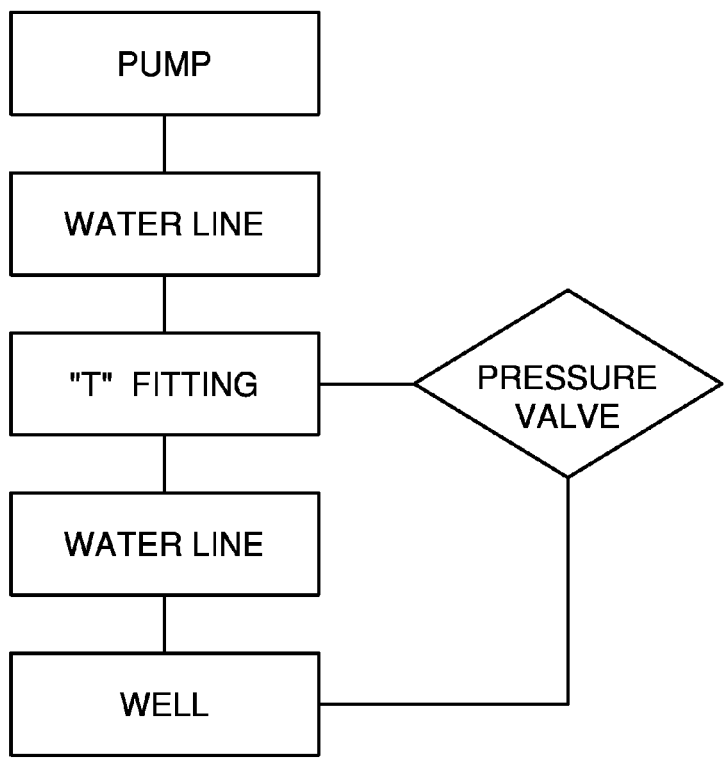
FIG. 3 is a schematic representation of the pumping circuit for the in-well aerator of the present invention.

The schematic shown in FIG. 3 represents the pump circuit used in conjunction with the present invention. The pump is typically a submersible pump that operates under the water level in the well. A discharge line exits the pump and is represented in FIG. 4 as the water supply line 42. The "T" fitting is the junction "T" fitting 12 which as shown in FIG. 4 is in-line with the water supply line 42. A portion of the water flow is directed through the junction "T" fitting and through the check-valve (depicted in FIG. 3 as a pressure valve). The check-valve does have a pressure threshold for allowing water to be sprayed through the nozzle. This is to ensure that the in-well aerator is functioning only when the pump is running. This prevents the water in the water supply line above the in-well aerator from leaking out through the check-valve when the pump is idle. Obviously only a portion of the water flow from the pump is directed through the in-well aerator. The actual amount can be controlled through the selection of the nozzle which will have a rated volume of flow. For the purposes of the present invention the actual volume of flow necessarily to achieve a result is variable and depends on the concentration of dissolved gases in the particular water supply. One benefit of the present invention is the fact that the spray discharged from the check-valve nozzle is directed to the well water. Preferentially the check-valve and nozzle assembly is positioned at a point where the spray will preferably impact the well water and agitate the surface thereby aerating the surface of the well water. The distance between the surface of the well water and the nozzle is typically only a matter of a few feet at the most otherwise the velocity of the spray will diminish with distance and will lose the ability to sufficiently agitate the surface of the well water. The distance will vary with the pressure of the discharge from the check-valve and nozzle and the volume and type of spray that emerges from the nozzle. This action is distinctly different in the present invention than in the prior art devices since the check-valve is located close to the pump and just above the water level established by the well water.

Thus it can be realized that the in-well aerator of the present invention not only promotes the volatilization of gases through the nozzle but also through the agitation of the surface of the well water. As the dissolved gases in the well water are blown off, the concentration at the surface of the well water is replenished given the vapor pressure of the dissolved gases and the natural mixing that occurs in the system. This means that the water supply in the well casing will see the concentration of dissolved gases drop as water is pumped through the system employing the present invention. Fresh supplies of water infiltrate into the well casing as water is pumped out and this supply is subjected again to the same processes. The end result is equilibrium where the performance of the in-well aerator reaches a point that is balanced against the infiltration of fresh water supplies (with a higher concentration of the dissolved gases) and the effects of the two produces a concentration of dissolved gases that is relatively constant. However, this concentration is far less than would be the case otherwise since there is a constant purging of the dissolved gases from the well water immediately in the vicinity of the well easing.

The components of the in-well aerator can be acquired as conventional plumbing parts. They are typically available as steel components although it is believed that some of the components could also be supplied as PVC or CPVC as well. The methods for assembling the components as shown in the drawings is conventional and is not specifically a part of the present invention although such methods are used to assemble the in-well aerator. The types of fittings may be modified as well such that any combination of plumbing fittings that could be used to laterally position a check-valve and nozzle in accordance with the teachings of the present invention would be acceptable. In addition, variations in the arrangement of the components can take place without departing from the spirit and scope of the present invention. The objective, however, remains to position the check-valve nozzle in the manner discussed herein, under conditions where a volume of spray is generated sufficient to volatize a substantial amount (if not all) of the dissolved gases in the water supply. Of course, this spray is then directed towards the surface of the well water for additional agitation and mixing.

I claim:

1. An aerator for the in-well water in a well casing for the volatilization of dissolved gases where a submersible pump is installed in the well casing and pumps well water through a water supply line, said aerator comprises:
  a) a check-valve fitting for discharging water at a select water pressure;
  b) a nozzle fitted to said check-valve for receiving the discharge of water from the check-valve and for directing the water into a spray; and
  c) a fitting between said check-valve and the water supply line for directing part of the pumped well water to said check-valve, the fitting between the check-valve and the water supply line is a "T" fitting, wherein said check-valve is set at a water pressure just less than the pressure of well water being pumped through the water supply line, wherein the spray from the nozzle is directed at the surface of the well water within the well casing, and wherein the check-valve and nozzle are positioned at a point above the surface of the well water within the casing where the spray impacts and agitates the surface of the well water.

2. An aerator for the in-well aeration of well water in a well casing for the volatilization of dissolved gases, where a submersible pump is installed in the well casing and pumps will water through a water supply line, the said aerator comprises:
  a) a check-valve fitting for discharging water at a select water pressure;
  b) a nozzle fitted to said check-valve for receiving the discharge of water from the check-valve and for directing the water into a spray; and
  c) a fitting between said check-valve and the water supply line for directing part of the pumped will water to said check-valve, where said fitting is a "T" fitting;
  d) wherein said check-valve is set at a water pressure just less than the pressure of well water being pumped through the water supply line, wherein the spray from the nozzle is directed at the surface of the will water within the will casing.

3. The aerator of claim 2, where the check-valve and nozzle are positioned at a point above the surface of the well water within the casing where the spray impacts and agitates the surface of the well water.

4. The aerator of claim 2, where the volume of spray is adjustable to correspond to the desired level of volatilization of the concentration of dissolved gases in the well water.

5. A pump circuit for pumping water from a well, where the pump circuit provides for the volatilization of dissolved gases, said pump circuit comprises:
  a) a submersible pump installed in the water well;
  b) a water supply line on the discharge side of said pump;
  c) an aerator for aerating water, the aerator comprising a check-valve fitting for discharging water at a select water pressure and a nozzle fitted to said check-valve for receiving the discharge of water from the check-valve and for directing the water into a spray; and
  d) a fitting between said check-valve and the water supply line for directing part of the pumped well water to said check-valve, where said fitting is a "T" fitting;

wherein said check-valve is set at a water pressure just less than the pressure of will water being pumped through the water supply line, wherein the spray from the nozzle is directed at the surface of the well water within the well casing.

6. The pump circuit of claim 5, where the check-valve and nozzle are positioned at a point above the surface of the well water within the casing where the spray impacts and agitates the surface of the well water.

7. The pump circuit of claim 5, where the volume of spray is adjustable to correspond to the desired level of volatilization of the concentration of dissolved gases in the well water.

* * * * *